United States Patent [19]
Miyake et al.

[11] Patent Number: 5,483,508
[45] Date of Patent: Jan. 9, 1996

[54] OPTICAL RECORDING AND REPRODUCING APPARATUS USING A HOLOGRAM TO DETECT AND JUDGE A PLURALITY OF PIT PATTERNS

[75] Inventors: Takahiro Miyake, Soraku; Tetsuo Ueyama, Yamatokoriyama; Toshiyuki Tanaka, Moriguchi; Yukio Kurata, Tenri, all of Japan

[73] Assignee: Sharp Kabushiki Kaisha, Osaka, Japan

[21] Appl. No.: 163,313

[22] Filed: Dec. 8, 1993

[30] Foreign Application Priority Data

Dec. 22, 1992 [JP] Japan .................................. 4-342652

[51] Int. Cl.⁶ .................................................. G11B 7/09
[52] U.S. Cl. ........................ 369/44.23; 369/54; 369/58; 369/106; 369/110; 369/111; 369/112
[58] Field of Search .................... 369/13, 44.12, 369/44.23, 54, 58, 94–95, 106, 109, 110, 111, 112, 120, 121, 44.26

[56] References Cited

U.S. PATENT DOCUMENTS 4,868,820 9/1989 Nagashima et al. ................. 369/112 X
5,070,495 12/1991 Bletscher, Jr. et al. ............. 369/111 X

FOREIGN PATENT DOCUMENTS 4-37486 6/1992 Japan .

*Primary Examiner*—W. R. Young
*Attorney, Agent, or Firm*—David G. Conlin; Kevin J. Fournier

[57] ABSTRACT

An optical recording and reproducing apparatus records two rows of a plurality of pit patterns with respect to one track by modulating two light beams and by converging the modulated two light beams in parallel onto the track. The plurality of pit patterns are detected and judged by a multiple hologram on which reflected object waves of all kinds of pit patterns are recorded, thereby enabling to carry out recording of information. With the arrangement, since multiple values recording and reproducing can be carried out with respect to a magneto-optical disk, the recording capacity becomes greater than the conventional case and the reproduced signal having little crosstalk can be obtained according to the present way of reproducing.

5 Claims, 12 Drawing Sheets

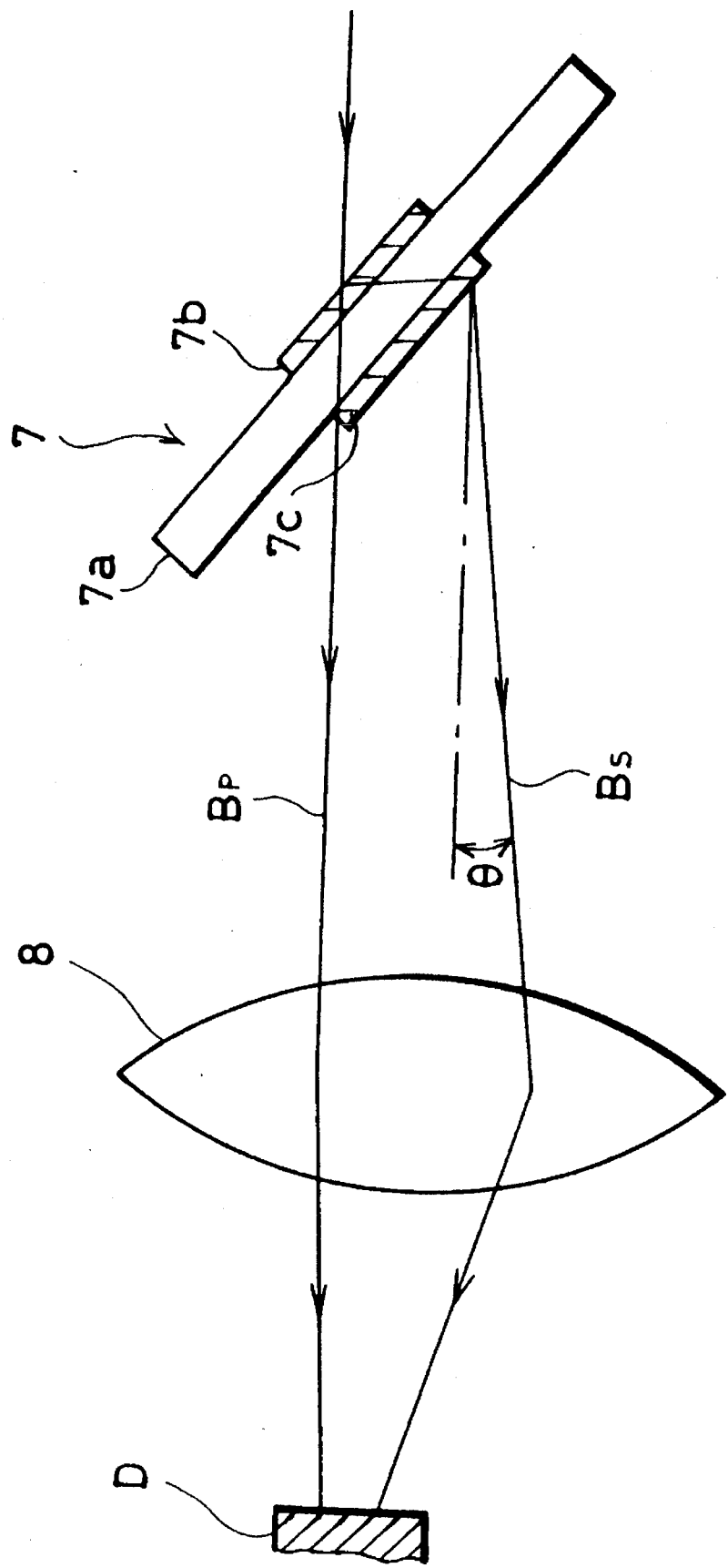

OPTICAL RECORDING AND REPRODUCING APPARATUS USING A HOLOGRAM TO DETECT AND JUDGE A PLURALITY OF PIT PATTERNS

FIELD OF THE INVENTION

The present invention relates to an optical recording and reproducing apparatus for use in a device such as an optical pickup which optically carries out recording and reproducing of information signal.

BACKGROUND OF THE INVENTION

In a conventional optical information recording and reproducing system, an optical disk provided with a spiral track composed of a series of pits is used, and a reproduced light beam obtained by projecting of a laser beam onto the optical disk is directed to a photodetector, thereby resulting in that a reproduced signal is detected by the photodetector. So, the conventional optical information recording and reproducing system has limits in its information recording density due to (1) a pit interval on each recording track and (2) a pitch of the recording tracks.

There is known a method of optically recording and reproducing of information which considers the abovementioned deficiency, the method being disclosed for example in the Japanese examined patent publication No. 4-37486/1992 (Tokukohei 4-37486). According to the method, as shown in FIG. 11, diffused light beams from a semiconductor laser 31 are directed to an objective lens 35 through a collimator lens 32, a polarizing beam splitter 33, and a quarter wave plate 34 so as to project converged light beams to an optical disk 30. Reflected light from the optical disk 30 is directed to the polarizing beam splitter 33 through again the objective lens 35 and quarter wave plate 34, and the reflected light is deflected by 90° so as to direct to a multiple hologram 36 (described later). The light beam incident on the multiple hologram 36 is a reproduced object wave beam in accordance with recorded pit patterns which are preliminarily formed on the optical disk 30. So, a reproduced reference wave beam is projected from the multiple hologram 36 to respective photodetectors 37a to 37d which correspond to the respective pit patterns, the reproduced reference wave beam having a projecting angle which varies depending on the kind of pit pattern. When it is assumed that there are, for example, four kinds of pit patterns as shown in FIGS. 12(a) to 12(d), total four photodetectors 37a to 37d are required accordingly. The beam incident on the respective photodetectors 37a to 37d is strongly directed to one of the photodetectors corresponding to the pit pattern. According to the detection that which detected output level is greatest among those of the photodetectors 37a to 37d, it can be judged which pit pattern on the optical disk 30 is reproduced. The transmitted light from the multiple hologram 36 is arranged by a convex lens 38 so as to form a converged light beam. The converged light beam is directed to a photodetector 39 for tracking and forcussing-uses. Servo signals are generated by the photodetector 39.

The following description deals with a manufacturing method of the multiple hologram 36 corresponding to the optical disk 30 with reference to FIG. 13.

First, a laser beam is directed to a beam splitter 40 from a light generating source (not shown). One of the split light beams by the beam splitter 40 is projected, through a polarizing beam splitter 41, a quarter wave plate 42, and an objective lens 43, onto the pit patterns preliminarily formed on the optical disk 30. Thereafter, a reproduced light beam, which is reflected from the pit pattern, is directed to the polarizing beam splitter 41 through the objective lens 43 and the quarter wave plate 42. The polarizing beam splitter 41 deflects the reproduced light beam by 90° so as to direct to the multiple hologram 36 as the object wave beam.

The other one of the light beams split by the beam splitter 40 is reflected by a mirror 46 through a half wave plate 44 and a convex lens 45 so as to direct to the multiple hologram 36 as the reference wave beam. In such case, the position and inclined angle of the mirror 46 changes in accordance with each pit pattern on the optical disk 30 such that the point, on which the image is formed when the reflected light beam is assumed to transmit the multiple hologram 36, coincides with the position where the detector for detecting the pit pattern is deposited. The interference fringes between the object wave beams in accordance with the respective pit patterns and the respective corresponding reference wave beams are in multiple recorded on the multiple hologram 36.

The conventional optical information recording and reproducing system can reproduce the four kinds of information from one recorded area. However, the pit paterns can be adapted only to a so-called CD-type apparatus for playback-use only which carries out reproducing in accordance with the preliminarily recorded shapes such as convex and concave. So, the problem arises that the abovementioned conventional system can not be directly adapted to a rewritable recording and reproducing apparatus such as a magneto-optical disk apparatus wherein the recording is carried out based on the m gneto-optical effects.

SUMMARY OF THE INVENTION

It is an object of the present invention to provide an optical recording and reproducing apparatus which can carry out recording/reproducing of a plurality of information on and from one track.

In order to achieve the foregoing object, an optical recording and reproducing apparatus in accordance with the present invention, which carries out recording/reproducing of information by projecting a light beam onto a track on a recording medium, has the following means.

More specifically, the present optical recording and reproducing apparatus has:

(1) first light generating means for generating recording-use and reproducing-use light beams;

(2) second light generating means for generating recording-use and reproducing-use light beams;

(3) optical recording means for recording of two rows of pit patterns with respect to one track by simultaneously converging the recording-use light beams from the respective first and second light generating means to the recording medium;

(4) hologram means, whereon each reflected object wave of the pit patterns is recorded, for outputting information signal varying depending on the reflected object wave from the pit pattern; and (5) optical reproducing means for reproducing of the information signal by judging the kind of the reproduced pit pattern in accordance with the hologram means when the reproducing-use light beam from either the first light generating means or the second light generating means is projected onto the pit pattern.

With the arrangement, the two rows of pit patterns are simultaneously recorded with respect to a single track of the recording medium in response to the generation of the recording-use light beams from the first and second light generating means. The kinds of pit patterns are judged by the hologram means wherein each reflected object wave of the pit patterns is recorded as phase distribution information or as light intensity distribution information. The information signal is reproduced in accordance with the judgement. So, the reproduced signal having little crosstalk can be obtained.

In such case, it is preferable that the pit width between the two rows of pit patterns is set less than half of the track width, thereby remarkably improving in the recording density of the optical recording medium and thereby enabling to carry out recording/reproducing of large volume of information with high quality.

When servo controlling means, for carrying out tracking and focussing of the light beam in accordance with the reflected light beam from the optical recording medium during recording and reproducing, is added to the above-mentioned arrangement, the trackings of the respective two recording-use light beams are carried out by the servo controlling means during recording while the tracking of one reproducing-use light beam is carried out by the servo controlling means during reproducing, thereby certainly carrying out recording/reproducing of the information which is recorded on the optical recording medium with high density.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention:

FIG. 2 is an explanatory diagram showing the operation of a polarization splitting device constituting the optical disk apparatus;

DESCRIPTION OF THE EMBODIMENTS

The following description deals with one preferred embodiment of the present invention with reference to FIG. 1 through FIGS. 10(a) and 10(b). Note that the present embodiment deals with the case where the optical recording medium is adapted to a magneto-optical disk and the optical recording and reproducing apparatus is adapted to an optical disk apparatus.

Figure 1:
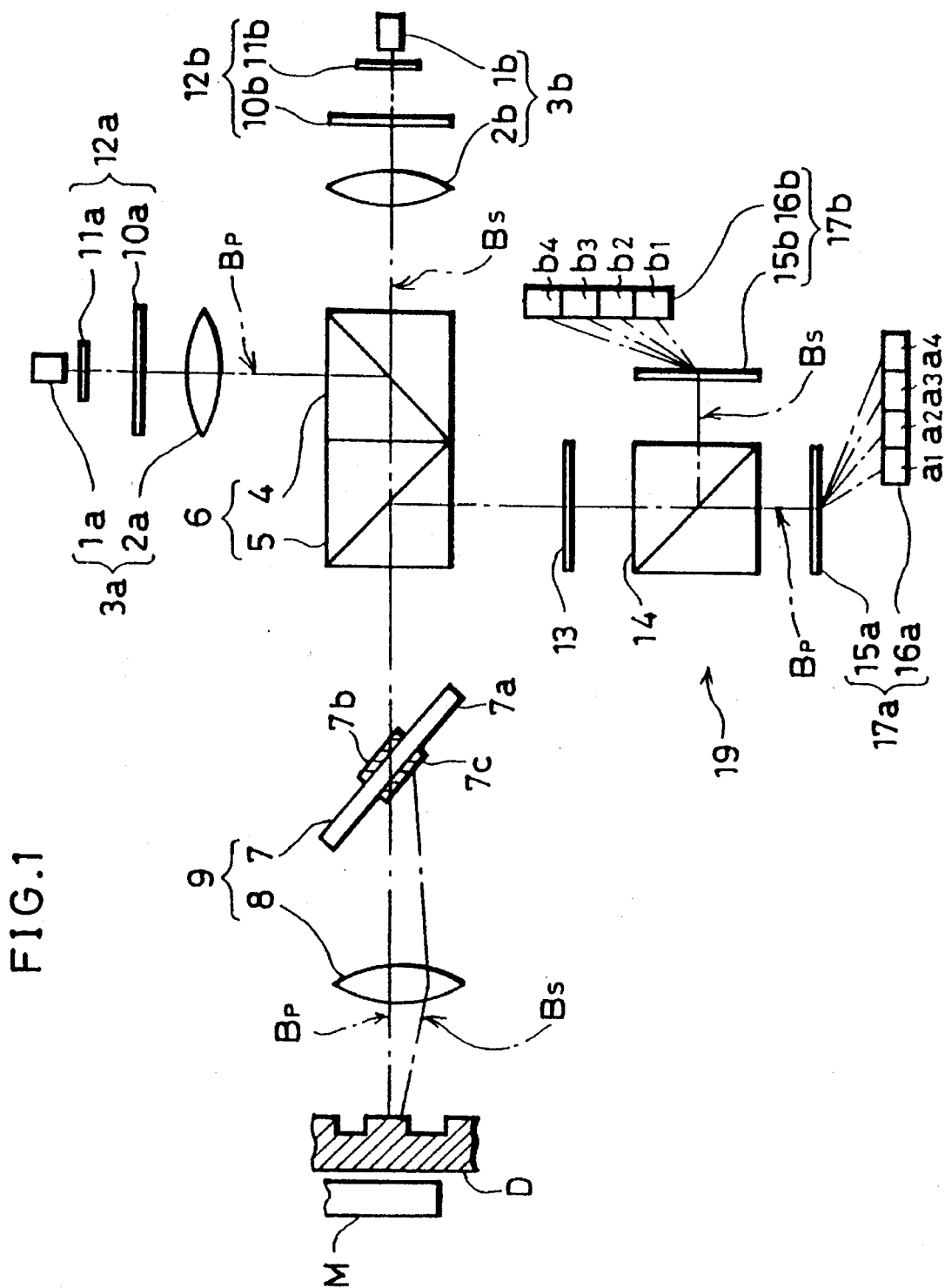
FIG. 1 is a schematic structuring diagram showing an optical disk apparatus of one embodiment in accordance with the present invention.

An optical recording and reproducing apparatus in accordance with the present embodiment, as shown in FIG. 1, is provided with a first and second light generators 3a and 3b for respectively generating laser light for optically recording and reproducing, a light guiding device 6 for guiding the laser light so as to form a predetermined optical path, and a converging device 9 for converging the laser light so as to project to a magneto-optical disk D. Note that a magnet M for generating a magnetic field is provided on a rear surface side of the magneto-optical disk D so as to direct magnetization directions of the magneto-optical disk D in one direction during recording/reproducing of information signal.

The first light generator 3a is composed of a semiconductor laser 1a for generating laser light $B_P$ having a P polarizing component and a collimator lens 2a for converting a beam projected from the semiconductor laser 1a into a parallel beam. The second light generator 3b is composed of a semiconductor laser 1b for generating laser light $B_S$ having a S polarizing component and a collimator lens 2b for converting a beam projected from the semiconductor laser 1a into a parallel beam.

The light guiding device 6 is composed of a beam splitter 4 and a half mirror 5 which is disposed next to the beam splitter 4. The laser light $B_P$ containing P polarizing component from the first light generator 3a and the laser light $B_S$ containing S polarizing component from the second light generator 3b are synthesized by the beam splitter 4.

The converging device 9 is composed of a polarization splitting device 7 and an objective lens 8 which are both provided between the half mirror 5 and the magneto-optical disk D. The polarization splitting device 7, as shown in FIG. 2, has a base 7a of plate which is made of transparent material such as glass. Both surfaces of the base 7a are in their centers provided with respective diffraction gratings 7b and 7c. The grating pitches of the respective diffraction gratings 7b and 7c are set to about a wave length of the incident light. With the arrangement, the light from the mirror 5 is split into the P polarizing component and S polarizing component, and the laser light $B_P$ containing the P polarizing component and the laser light $B_S$ containing the S polarizing component are converted into the respective parallel beams so as to project toward the objective lens 8.

Figure 3A:
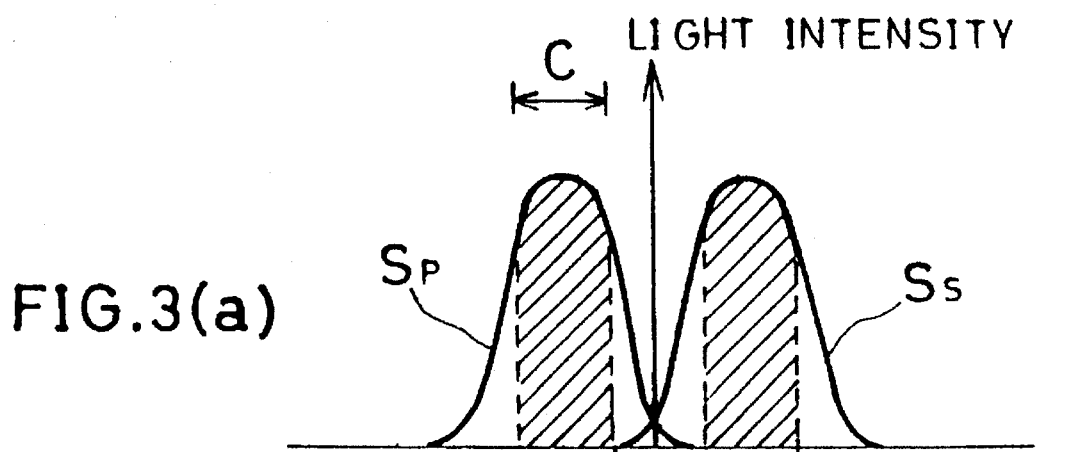
FIG. 3(a) is a graph showing the light intensity distribution of a laser light containing P polarizing component and S polarizing component.
Figure 3B:
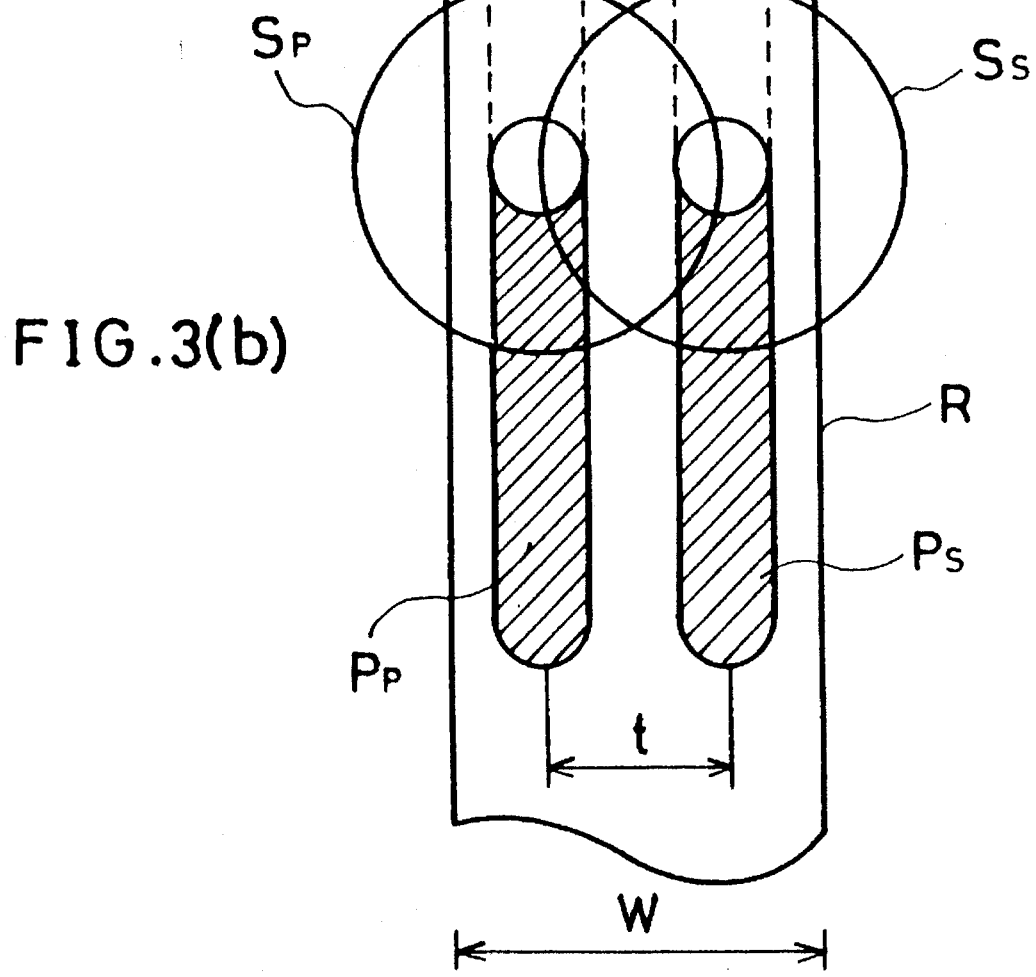
FIG. 3(b) is an explanatory diagram showing how the laser light is projected onto a track on a magneto-optical disk.

Each of the laser light $B_P$ and the laser light $B_S$ is projected so as to be converged to the track on the magneto-optical disk D by the objective lens 8. However, it is required as shown in FIG. 3(b) that two rows of pit patterns be recorded on a recording track R. It is required to deviate the converged centers of the respective laser light $B_P$ and laser light $B_S$ so as to keep a distance by a pit interval t from each other. The pit interval t indicates a distance between the pit patterns $P_P$ and $P_S$, and is preferably half of the track width W.

According to the present embodiment, the grating pitch of the diffraction grating 7c on the rear surface side of the polarization splitting device 7 is differently manufactured from that of the diffraction grating 7b on the front surface side such that the optical axis of the laser light $B_P$ containing the S polarizing component is inclined by a predetermined angle θ with respect to that of the the laser light $B_P$ containing the P polarizing component. The angle θ is given by the equation of $θ=\tan^{-1}(t/f)$, where f represents a focal distance of the objective lens 8. Thus, when both of laser light $B_P$ and laser light $B_S$ are projected, the two rows of pit patterns $P_P$ and $P_S$ are formed on the magneto-optical disk D (see FIG. 3(b)).

Note that the two laser light $B_P$ and Bcan be generated, instead of adopting the polarization splitting device 7, by slightly deviating (by inclining of angle θ) the optical axises of the respective semiconductor lasers 1a and 1b.

Figure 4A:
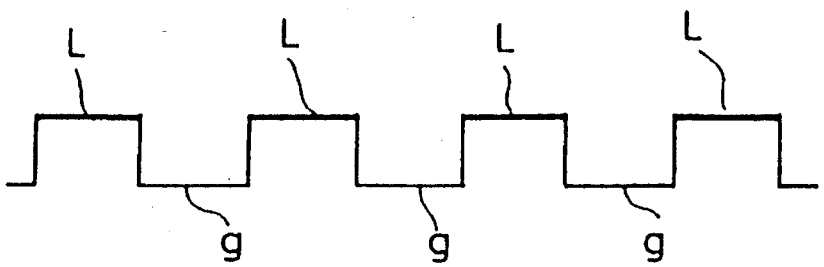
FIG. 4(a) is a longitudinal sectional view showing a conventional magneto-optical disk.
Figure 4B:
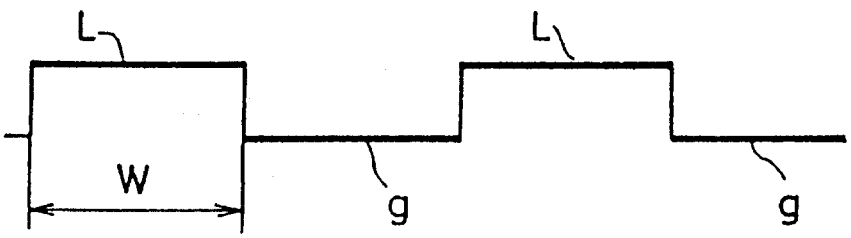
FIG. 4(b) is a longitudinal sectional view showing the present magneto-optical disk.

The following description deals with the sectional shape of the magneto-optical disk D for use in the present optical disk apparatus. The sectional shape of the conventional magneto-optical disk is defined by alternating a land portion L and a groove portion g (see FIG. 4(a)), and the recording pit patterns are generally provided on either the land portion L or the groove portion g (according to FIG. 4(a), the pit patterns are provided on the land portion L written in bold strokes). In contrast, according to the present embodiment, as shown in FIG. 4(b), the cycle of the land portion L and the groove portion g is double as large as that of the conventional case so as to widen the widths of the land portion L and the groove portion g. However, note that the recorded pit patterns are provided on both the land portion L and the groove portion g, thereby enabling to widen the width of the area where the pit patterns are provided without reduction of the recording area.

With the arrangement, as shown in FIG. 3(b), the two rows of pit patterns $P_P$ and $P_S$ can be provided by projecting the laser light $B_P$ and $B_S$ to the area where the recorded pit patterns are provided. In a case where the optical recording medium is a magneto-optical recording medium, according to its recording principle, the recording pit pattern is formed when the temperature of the recording portion rises, in accordance with the projection of the converged light beam, to temperatures of not less than the recordable temperature, i.e., the Curie temperature.

So, it is required that the relation between a pit width C and the track width W satisfies C<W/2 in order to definitely provide the two rows of pit patterns $P_P$ and $P_S$ on the recording track R by converging two rows of the light spots $S_P$ and $S_S$ to the track R. Therefore, the composition of the magneto-optical recording medium is set so that only the slanting areas of the light intensity distributions of respective beam spots $S_P$ and $S_S$ of FIG. 3(a) reach the Curie temperature. With this arrangement, as shown in FIG. 3(b), the recorded pit patterns $P_P$ and $P_S$ can be provided in the track R.

Further, the optical disk apparatus of the present embodiment is provided with (1) first and second servo controlling devices 12a and 12b for carrying out the tracking and focussing of the respective laser light $B_P$ and laser light $B_S$ in accordance with the reflected light from the magneto-optical disk D, and (2) an optical reproducing device 19 for reproducing of the information signal in accordance with the reflected light from the magneto-optical disk D.

The first servo controlling devices 12a is composed of a hologram device 10a and a photodetector 11a which are both provided between the collimator lens 2a and the semiconductor laser 1a. The second servo controlling devices 12b is composed of a hologram device 10b and a photodetector 11b which are both provided between the collimator lens 2b and the semiconductor laser 1b.

The following description deals with how the first and second servo controlling devices 12a and 12b detect servo signals. When the reflected light from the magneto-optical disk D reaches again the beam splitter 4 through the objective lens 8, the polarization splitting device 7 and the half mirror 5, the reflected light is split into the laser light $B_S$ containing the S polarizing component (a reflected light component of a spot $S_S$ on the magneto-optical disk D) and the laser light $B_P$ containing the P polarizing component (a reflected light component of a spot $S_P$ on the magneto-optical disk D).

The laser light $B_S$ split by the beam splitter 4 is directed to the hologram device 10b through the collimator lens 2b, and is diffracted by the diffraction grating of hologram device 10b toward the photodetector 11b so as to reach the photodetector 11b. The laser light $B_P$, which is deflected by 90° due to the splitting of the beam splitter 4, reaches hologram device 10a through the collimator lens 2a and is similarly diffracted so as to reach the photodetector 11a.

Figure 5A:
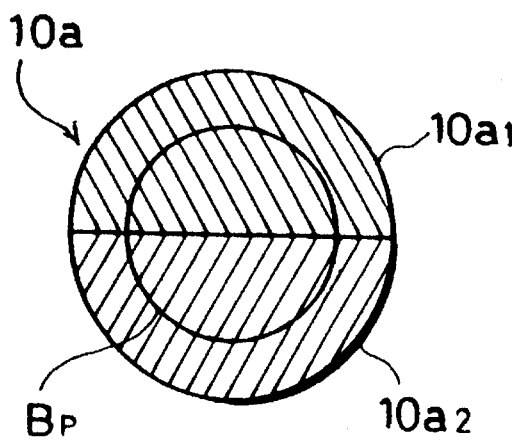
FIG. 5(a) is a longitudinal sectional view showing a hologram device constituting a first servo controlling means.
Figure 5B:
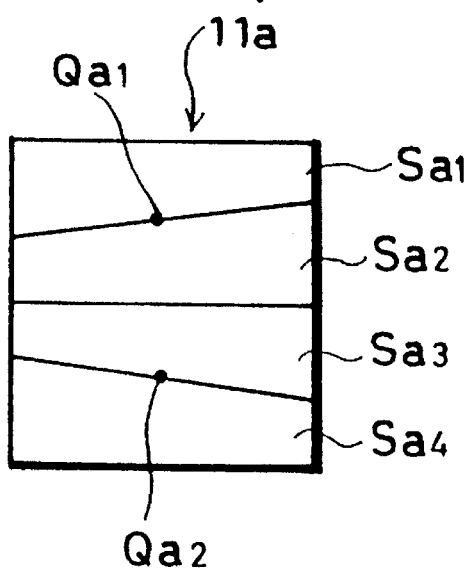
FIG. 5(b) is an elevational view showing four-divided photodetector constituting the first servo controlling means.
Figure 6A:
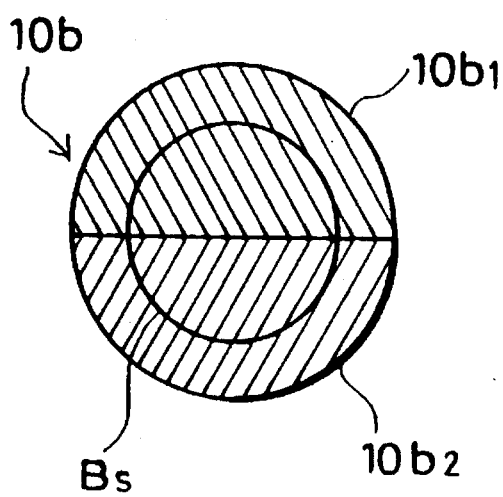
FIG. 6(a) is a longitudinal sectional view showing a hologram device constituting a second servo controlling means.
Figure 6B:
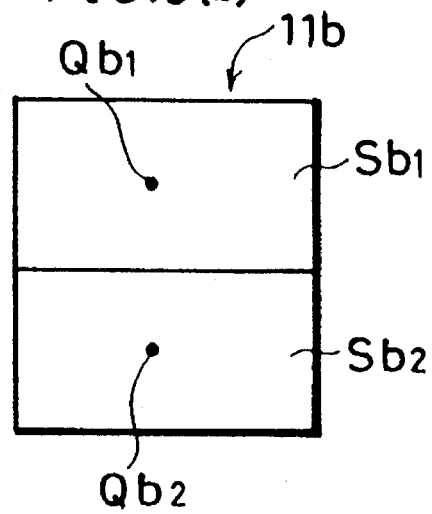
FIG. 6(b) is an elevational view showing two-divided photodetector constituting the second servo controlling means.

The hologram device 10a is divided into two portions, i.e., an upper portion $10a_1$ and a lower portion $10a_2$ (see FIG. 5(a)). The hologram device 10a is designed such that the incident laser light $B_P$ on the upper portion $10a_1$ forms a spot $Qa_1$ on a partition line between segments $Sa_1$ and $Sa_2$, the segments $Sa_1$ and $Sa_2$ being the two segments of a four-divided photodetector 11a (see FIG. 5(b)). The hologram device 10a is designed such that the incident laser light $B_P$ on the lower portion $10a_2$ forms a spot $Qa_2$ on a partition line between segments $Sa_3$ and $Sa_4$ of the four-divided photodetector 11a (see FIG. 5(b)).

It is assumed that signals of the respective segments $Sa_1$, $Sa_2$, $Sa_3$, and $Sa_4$ which vary in proportion to the incident light amounts thereon have the same reference numerals, i.e., $Sa_1$, $Sa_2$, $Sa_3$, and $Sa_4$, as those of the respecive segments. Then, a focussing error signal can be detected as $[(Sa_1-Sa_2)+(Sa_4-Sa_3)]$. The hologram device 10b is also divided into two portions, i.e., an upper portion $10b_1$ and a lower portion $10b_2$ (see FIG. 6(a)). Note that since the photodetector 11b has no necessity of the detection of focussing error signal, so it is divided into two segments $Sb_1$ and $Sb_2$ (see FIG. 6(b)). The light beams are divided by the upper and lower portions $10b_1$ and $10b_2$ so as to respectively form spots $Qb_1$ and $Qb_2$ on the center of the segments $Sb_1$ and $Sb_2$.

In order to detect a radial error signal, it is required to control the laser light $B_P$ and $B_S$ during recording operation so as to be located on the center of the track R (see FIG. 3(b)). So, it is necessary to add (1) a push-pull signal $PP_1=[((Sa_1+Sa_2)-(Sa_4+Sa_3)]/(Sa_1+Sa_2+Sa_3+Sa_4)$ of the photodetector 11a to which the reflected light of the spot $S_P$ of the P polarizing component returns and (2) a push-pull signal $PP_2=((Sb_1-Sb_2)/(Sb_1+Sb_2)$ to which the reflected light of the spot $S_S$ of the S polarizing component returns. By making a radial error signal $(PP_1+PP_2)$ become zero, the spots $S_P$ and $S_S$ are controlled so as to be symmetrically positioned with respect to the center line of the track R (see FIG. 3(b)).

Figure 7A:
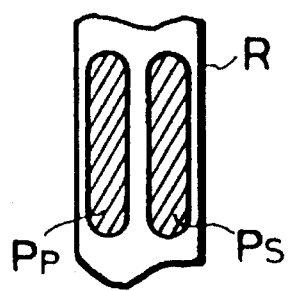
FIGS. 7(a) to 7(d) are explanatory diagrams respectively showing pit patterns indicative of multiple-value information.
Figure 7B:
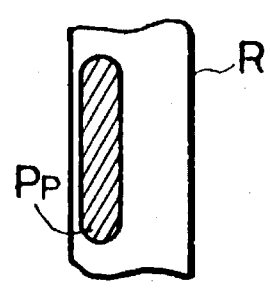
Figure 7C:
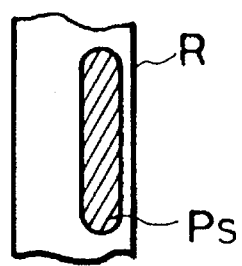
Figure 7D:
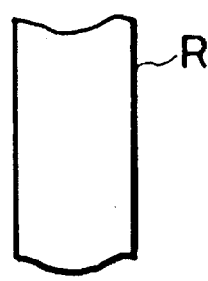

The foregoing description deals with the example wherein the magneto-optically recorded pit patterns $P_P$ and $P_S$ of FIG. 7(a) are recorded and controlled. In a case where only pit pattern $P_P$ of FIG. 7(b) is recorded, the recording of the pit pattern can be carried out by projection of the laser light $B_P$ having a recording high power from the semiconductor laser 1a while projecting the laser light $B_S$ having a reproducing low power, by which the recording can not be carried out but can return after reflecting from the recording medium, from the semiconductor laser 1b. Similarly, in a case where only pit pattern $P_S$ of FIG. 7(c) is recorded, the recording can be carried out by controlling the semiconductor laser 1a so as to have the reproducing low power while controlling the semiconductor laser 1b so as to have the recording high power. In a case where neither pit pattern $P_P$ nor $P_S$ is recorded, the recording can be carried out by controlling the semiconductor lasers 1a and 1b so as to respectively have the reproducing low power.

Figure 8:
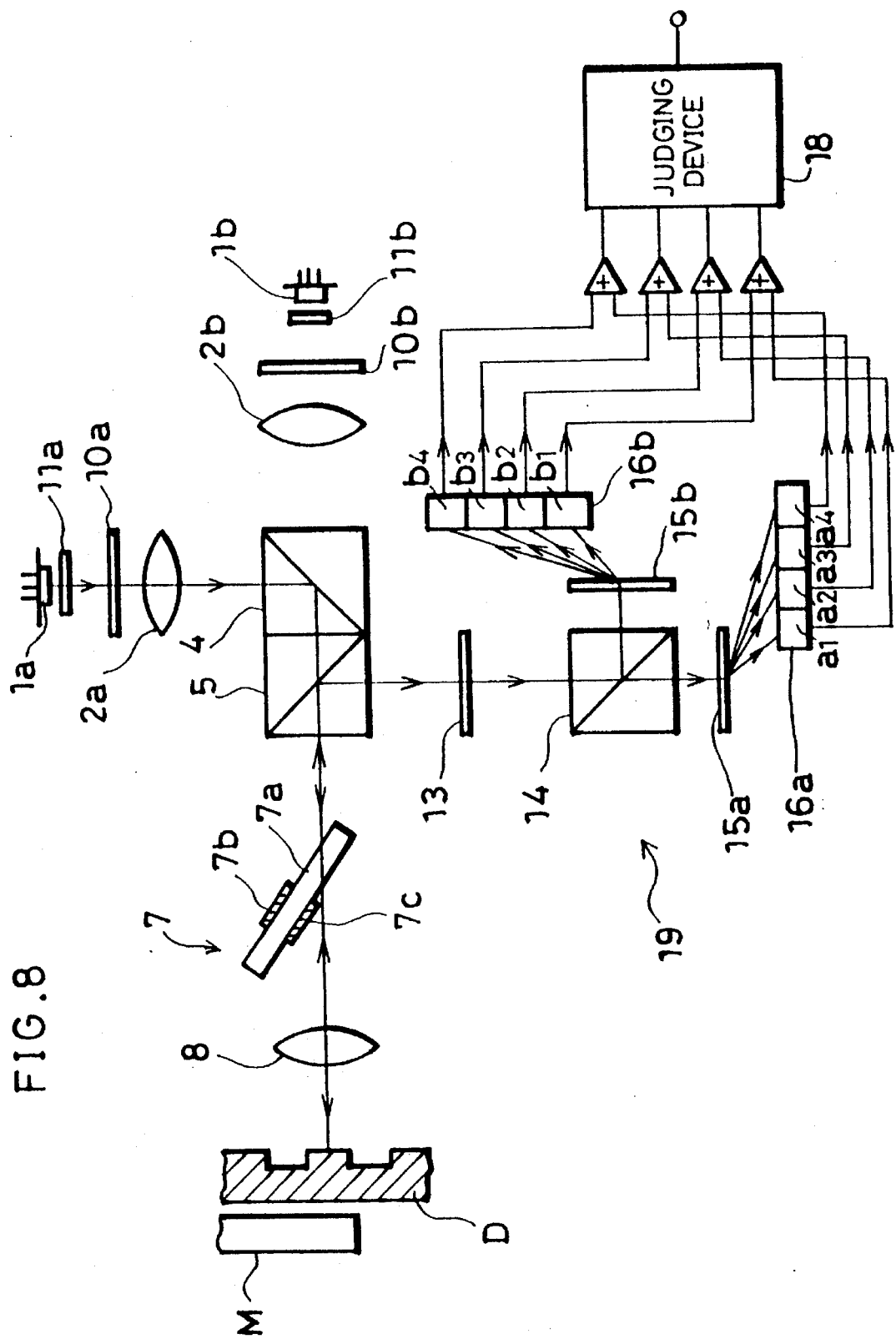
FIG. 8 is an explanatory diagram showing a reproducing operation of the multiple-value information by use of the optical disk apparatus.

The optical reproducing device 19 is, as shown in FIGS. 1 and 8, provided with a half wave plate 13, a beam splitter 14, first and second photodetectors 17a and 17b, and judging device 18. The first photodetector 17a is composed of a multiple hologram 15a and a photodetector 16a, while the second photodetector 17b is composed of a multiple hologram 15b and a photodetector 16b.

Figure 9:
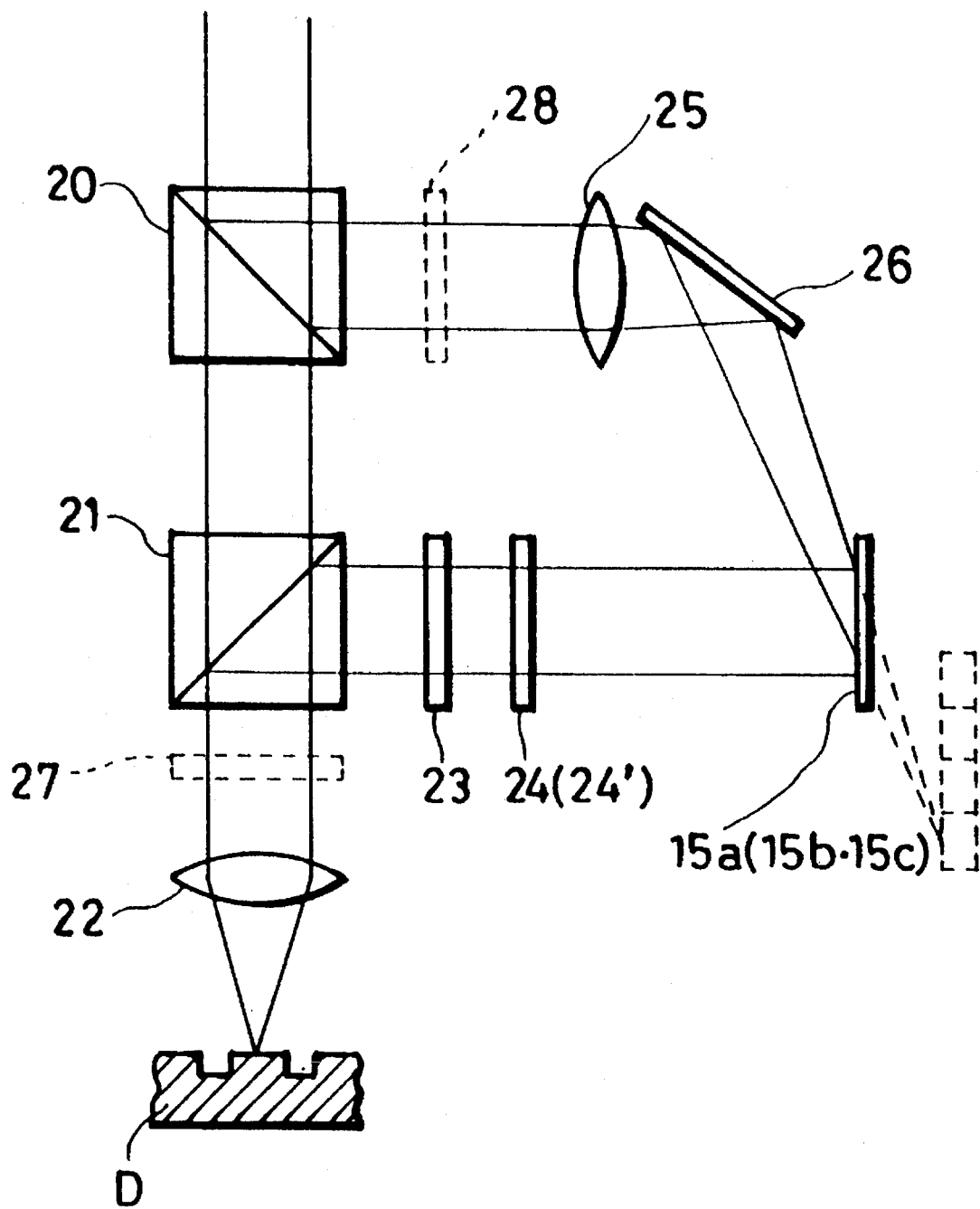
FIG. 9 is an explanatory diagram showing how the hologram device constituting the optical disk apparatus is manufactured.

The following description deals with how to manufacture the multiple holograms 15a and 15b corresponding to the present magneto-optical disk D with reference to FIG. 9.

First, a laser beam from a light generating source (not shown) having only S polarizing component, for example, is split into two beams. One of the two split beams is converged to the magneto-optical disk D through a polarizing beam splitter 21 and an objective lens 22. Either one of the pit patterns of FIGS. 7(a) to 7(d) is already recorded on the magneto-optical disk D. Thereafter, the reflected light from the pit pattern is directed again to the polarizing beam splitter 21 through the objective lens 22, and is split by the polarizing beam splitter 21. One of the beams split by the polarizing beam splitter 21 is deflected by 90° so as to transmit an analyzer 24 for transmitting only the P polarizing component therethrough a half wave plate 23. Thereafter, the transmitted light from the analyzer 24 reaches the multiple hologram 15a as the object wave beam having the light intensity distribution of only P polarizing component of the magneto-optically recorded pit pattern.

In contrast, the other beam split by the beam splitter 20 is reflected by a mirror 26 which has its positions and angles varied depending on the magneto-optical recording patterns so as to direct to and reach the hologram 15a as the reference wave beam through a convex lens 25.

As mentioned above, the interference fringes between the object wave beams of the P polarizing component in accordance with the respective corresponding magneto-optically recorded pit patterns of FIGS. 7(a) to 7(d) and the respective reference wave beams are in multiple recorded with exposed on the multiple hologram 15a. Thus, the multiple hologram 15a is manufactured. In such case, the relation between the transmittivity and reflectivity of the beam splitter 20 is preferably designed such that the light amounts of the object wave beam and reference wave beam substantially equal with each other. In the similar manners, when an analyzer 24 for transmitting the S polarizing component therethrough is inserted, instead of the analyzer 24 for transmitting the P polarizing component, the hologram 15b is manufactured by the object wave beam of S polarizing component.

With respect to each of the holograms 15a and 15b, the light intensity distributing information of the P polarizing component and of S polarizing component in the magento-optical pit patterns on the magneto-optical disk D are respectively recorded. However, another hologram may record magneto-optical pit patterns by changing the magneto-optical pit patterns into phase information. In the way of recording of such case, the half wave plate 23 and analyzer 24 (24') of FIG. 9 are not used. Instead, (1) a quarter wave plate 27 is provided between the polarizing beam splitter 21 and objective lens 22, and (2) a half wave plate 28 is provided between the beam splitter 20 and the convex lens 25. In such case, the laser beam from a light generating source (not shown) is split into two transmitted light beams by the beam splitter 20. One of the two transmitted light beams from the polarizing beam splitter 21 is directed to the quarter wave plate 27 so as to be converted into a circularly polarized light beam, and the circularly polarized light beam is converged onto the magneto-optical disk D by the objective lens 22.

It is well known that the circularly polarized light beam has a phase lead or phase lag in accordance with the vertical magnetization direction of the magneto-optical disk D. So, a circularly polarized light beam, among the circularly polarized light beams which are directed to the pit pattern on the magneto-optical disk D and are reflected from the magneto-optical disk D, reflected from the pit portion has for example the phase lead while the circularly polarized light beam reflected from the non-pit portion has the phase lag. Thus, the reflected light beam is regarded as the phase information into which the pit pattern information is converted. The reflected light beam is again converted by the quarter wave plate 27 into a linearly polarized light beam bearing the phase information of pit pattern and is deflected by 90° so as to be projected to a hologram 15c as the object wave beam obtained by converting the pit pattern into the phase information.

The other light beam which is deflected by 90° by the beam splitter 20 is directed to the hologram 15c as a reference wave beam together with the polarized wave of the above-mentioned object wave beam through the half wave plate 28, convex lens 25 and mirror 26, thereby manufacturing the hologram 15c. In such case, according to the above-mentioned principle, only one kind of the hologram 15c exists. In the case where the recording medium is a phase transition-type medium, the pit pattern bears the convex and concave information. So, the pit pattern can be recorded as an object wave beam obtained by converting the pit pattern into the phase information on the single hologram 15c in accordance with the method of FIG. 9.

Figure 10A:
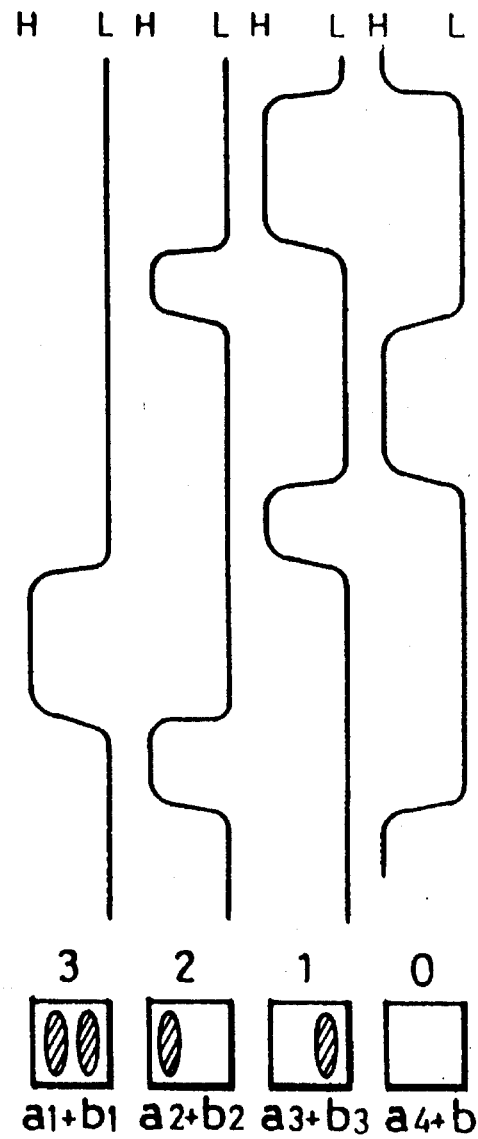
FIG. 10(a) is an explanatory diagram showing each signal pattern during reproducing of the multiple-value information.
Figure 10B:
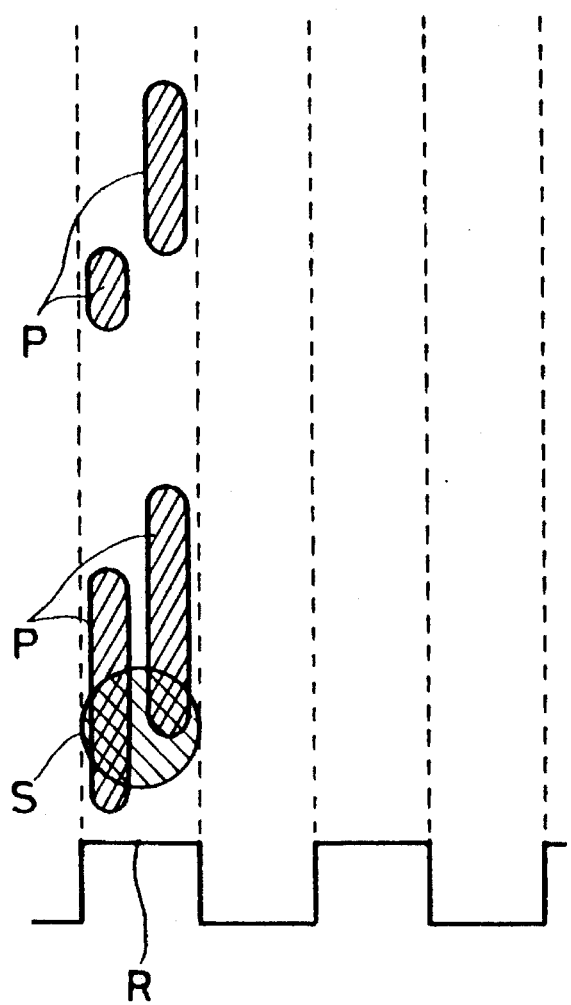
FIG. 10(b) is an explanatory diagram showing a tracing state of the pit pattern during reproducing of the multiple-value information.
Figure 11:
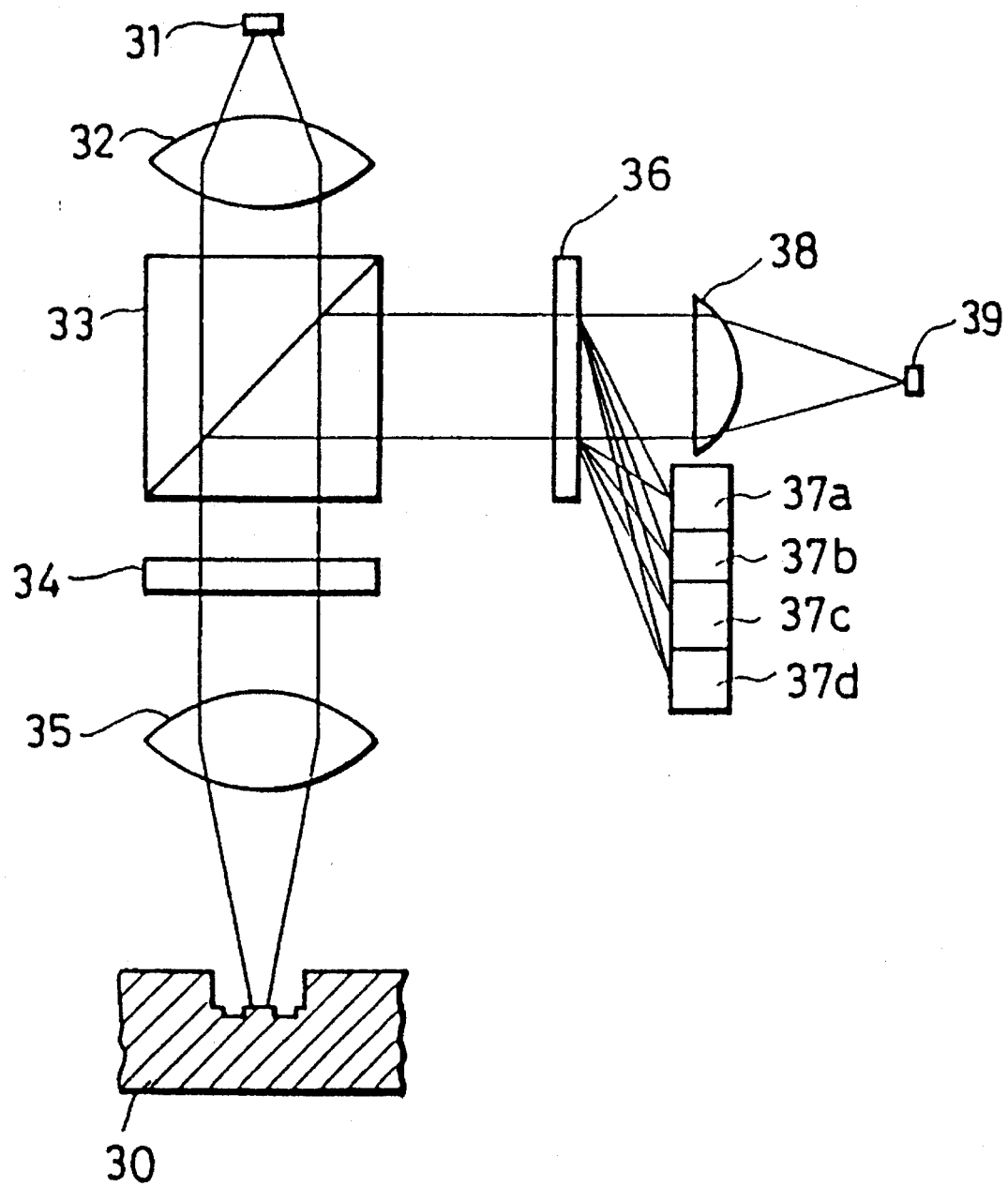
FIG. 11 is a schematic structuring diagram showing a conventional system for reproducing of the multiple-value information.
Figure 12A:
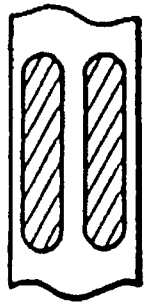
FIGS. 12(a) to 12(d) are explanatory diagrams respectively showing each pit pattern indicative of the multiple-value information which is reproduced by the system.
Figure 12B:
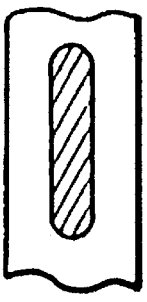
Figure 12C:
Figure 12D:
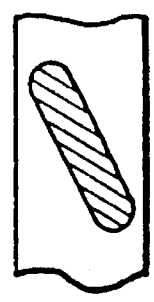
Figure 13:
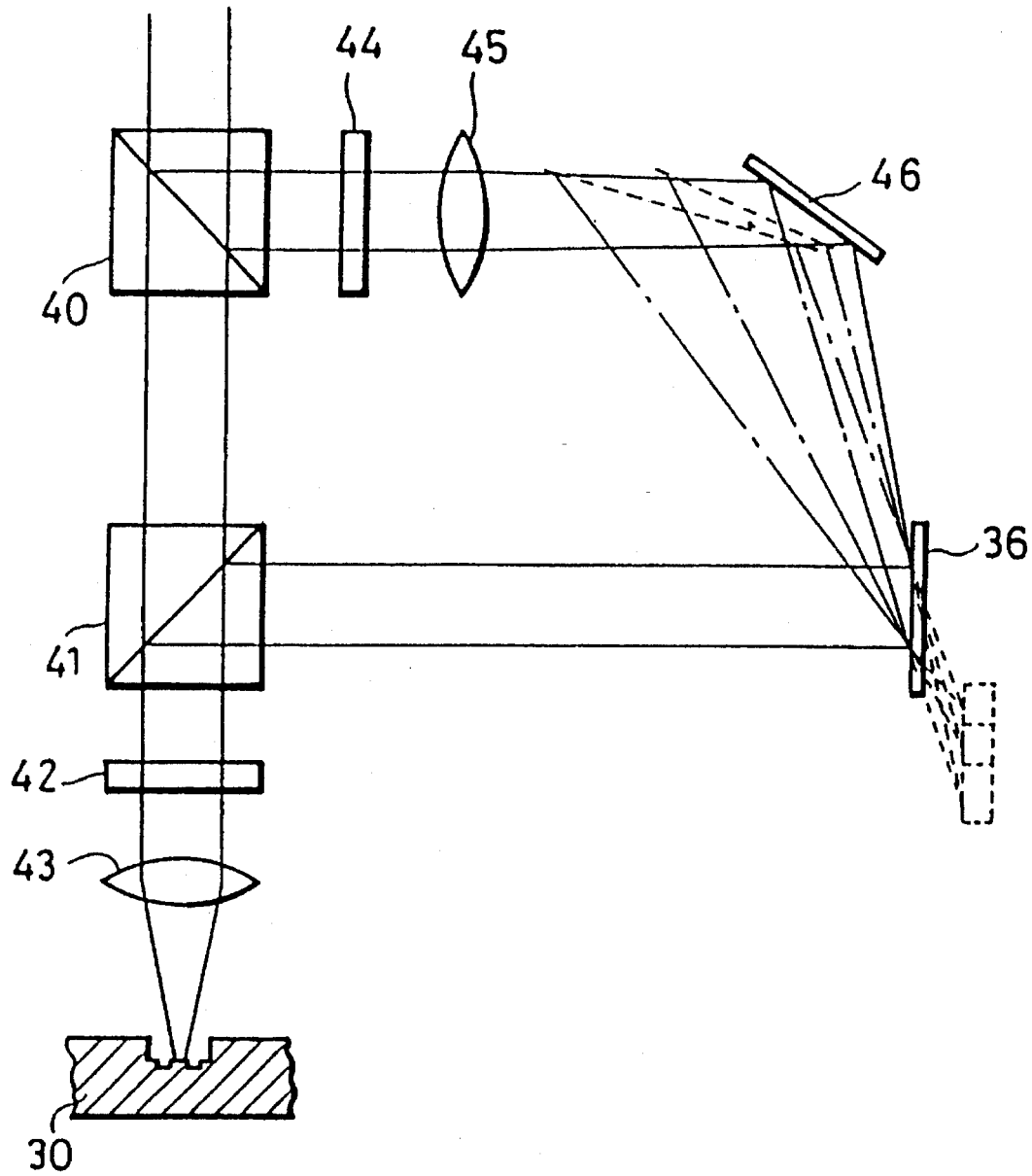
FIG. 13 is an explanatory diagram showing how the hologram device constituting the system is manufactured.

The following description deals with how the first and second photodetectors 17a and 17b reproduces four kinds of recording patterns of FIGS. 7(a) to 7(d) with reference to FIGS. 8, 10(a) and 10(b).

Since only one beam is used, the semiconductor laser 1b is turned off while the semiconductor laser 1a is turned on with the reproducing low power (see for example FIG. 8). The light beam projected from the semiconductor laser 1a transmits the collimator lens 2a and is deflected by 90° by the beam splitter 4 so as to direct to the half mirror 5. During this reproduction, the polarization splitting device 7 is deviated toward, for example, the upper direction so that the beam does not reach the respective diffraction gratings 7b and 7c. With the arrangement, the reproducing beams transmit the polarization splitting device 7 as they are, and are converged as one light beam by the objective lens 8 onto the magneto-optical disk D so as to form a spot S on the center of the track R (see FIG. 10(b)). Note that the foregoing description is not adapted for the case where the polarization splitting device 7 is not used.

Thereafter, the reflected light from the magneto-optical disk D reaches the polarization splitting device 7 through the objective lens 8 and, as mentioned above, transmits the polarization splitting device 7 as it is without being split into the polarized light components. The reflected light is deflected by 90° by the half mirror 5 and reaches the beam splitter 14 through the half wave plate 13. The reflected light beam which is reproduced is split into the P polarizing component and S polarizing component by the beam splitter 14. For example, the P polarizing component transmits the beam splitter 14 and reaches, as the object wave beam, the multiple hologram 15a on which the P polarizing component light of the four kinds of pit patterns are recorded so as to diffract the reference wave beam toward the four-divided photodetector 16a in accordance with the multiple hologram 15a. An element corresponding to the pit pattern to which the reproducing is carried out has the greatest incident light intensity among respective elements $a_1$ to $a_4$ of the four-divided photodetector 16a.

In contrast, the S polarizing component is deflected by 90° by the beam splitter 14 and reaches the multiple hologram 15b on which the S polarizing component light of the pit patterns are recorded. Thereafter, the S polarizing component light, like the P polarizing component light, diffracts toward the four-divided photodetector 16b so that an element corresponding to the pit pattern to which the reproducing is carried out has the greatest incident light intensity among respective elements $b_1$ to $b_4$ of the four-divided photodetector 16b.

The sums between each output of the elements $a_1$ to $a_4$ and the corresponding output of the elements $b_1$ to $b_4$ are compared with each other. More specifically, $(a_1+b_1)$, $(a_2+b_2)$, $(a_3+b_3)$, and $(a_4+b_4)$ are respectively summed up, and these sums are respectively sent to the judging device 18, thereby resulting in that it can be judged that which pit pattern on the magneto-optical disk D is projected by the reproducing light.

FIGS. 10(a) and 10(b) show an example of reproducing of the magneto-optical recording signal by use of the foregoing method. FIG. 10(b) shows the state where the pit pattern P recorded on one track R of the magneto-optical disk D is being reproduced by tracing the spot S on the track R in a right direction of the drawing. FIG. 10(a) shows the reproduced signal patterns which are respectively judged and outputted by the judging device 18 in accordance with the output from the element corresponding to each pit pattern. In such example, four kinds of information can be recorded on one recording area, and double recording capacity can be obtained compared to the conventional case, since the track density is the same as that of the conventional case. Further, the recording capacity can be improved by increasing the pit patterns and track density. The foregoing reproducing principle does not present the conventional problem that the crosstalk from the adjoining tracks due to the increasing of the track density deteriorates the quality of reproduced signal, thereby resulting in that the reproducing of information can be carried out with good signal quality.

The foregoing embodiment does not limit the present invention. Many changes and modifications can be made within the scope of the present invention. More specifically, the foregoing description deals with one example wherein the multiple holograms 15a and 15b, on which the pit patterns are recorded as the light intensity distributing information of the P polarizing component light and S polarizing component light, are used. However, in the case, including the case where recording and reproducing of the phase transition-type recording medium are carried out, where the hologram 15c on which the pit patterns are recorded as the phase information, is used, the half wave plate 13, beam splitter 14, multiple hologram 15b and photodetector 16b of FIGS. 1 and 8 are not used. Instead, (1) a quarter wave plate is provided between the polarization splitting device 7 and objective lens 8, and (2) the hologram 15c which is substituted for the hologram 15a is provided, thereby enabling to carry out the same recording and reproducing operations as those of the foregoing case.

As mentioned above, the optical recording and reproducing apparatus of the present invention includes:

first and second light generating means for generating beams for optically recording and reproducing, and for modulating and converging the respective beams onto an optical recording medium so as to record two rows of pit patterns on one track; and optical reproducing means for reproducing of information signal by judging the kind of the pit pattern in accordance with a hologram on which each reflected object wave beam of the pit patterns is recorded.

With the arrangement, it is possible to obtain the reproduced signal having little crosstalk. Accordingly, a plurality of information can be recorded/reproduced with respect to (1) a magneto-optical recording medium where the recording of pit patterns is carried out with respect to the area having temperatures of not less than the Curie temperature during projection of the recording-use beam and (2) a phase transition-type recording medium where the recording of pit patterns is carried out with respect to the area changing in its shape during projection of the recording-use beam.

Another optical recording and reproducing apparatus of the present invention includes:

first and second light generating means for generating beams for optically recording and reproducing, and for converging and modulating the respective beams onto an optical recording medium so as to record two rows of pit patterns on one track;

optical reproducing means for reproducing of information signal by judging the kind of the pit pattern in accordance with a hologram on which each reflected object wave beam of the pit patterns is recorded; and servo controlling means for tracking the beams projected onto the optical recording medium, wherein the servo controlling means carries out the tracking of the two recording-use beams by controlling so that a summing signal of push-pull signals of the reflected light of respective beams from the track becomes zero, when the information signal is recorded on the optical recording medium in response to the recording-use beams generated from the first and second light generating means, and the servo controlling means carries out the tracking of the one reproducing-use beam by controlling so that a push-pull signal of the reflected of the beam from the track becomes zero, when the information signal is reproduced from the optical recording medium in response to either one of the recording-use beams generated from the first and second light generating means.

With the arrangement, the recording of information can be surely carried out with high density, and the information which is recorded on the optical recording medium with high density can be surely recorded.

The reflected object wave of the pit pattern recorded on the hologram is obtained by converting the reflected light of the recorded pit pattern into the phase distributing information or by converting the reflected light of the recorded pit pattern into the light intensity distributing information, thereby ensuring to reproduce the information recorded with high density.

In the optical recording and reproducing apparatus, the object wave beam is composed of the P polarizing component and S polarizing component which the reflected light from the magneto-optical pit pattern is split into. The hologram may be composed of two kinds of holograms which are formed by the interference fringes between the object wave beams of the respective P polarizing component and S polarizing component and the respective reference wave beams of the corresponding polarizing components which light amounts substantially equal those of the object wave beams.

With the arrangement, it further ensures to reproduce the information recorded with high density.

There are described above novel features which the skilled man in the art will appreciate give rise to advantages. These are each independent aspects of the invention to be covered by the present application, irrespective of whether or not they are included wihtin the scope of the following set of claims.

What is claimed is:

1. An optical recording and reproducing apparatus for carrying out recording and reproducing of information by projecting a light beam onto a track on a recording medium, comprising:

first generating means for respectively generating recording-use and reproducing-use light beams;

second light generating means for respectively generating recording-use and reproducing-use light beams;

optical recording means for recording of two rows of pit patterns with respect to one track by simultaneously converging the recording-use light beams from the respective first and second light generating means to the recording medium;

hologram means, whereon each reflected object wave of the pit patterns is recorded, for outputting an information signal varying depending on the reflected object wave from the pit pattern; and optical reproducing means for reproducing of the information signal by judging the kind of the reproduced pit pattern in accordance with said hologram means when the reproducing-use light beam from either said first light generating means or said second light generating means is projected onto the pit pattern;

wherein each reflected object wave of the pit patterns recorded on said hologram means is obtained by converting the reflected light of the recorded pit pattern into a light intensity distributing information; and wherein the object wave is composed of a P polarizing component and an S polarizing component into which the reflected light from a magneto-optical pit pattern is split, and said hologram means is composed of two kinds of holograms which are formed by interference fringes between (1) the object wave beams of the respective P polarizing component and S polarizing component and (2) the respective reference wave beams of the corresponding polarizing components which light amounts substantially equal those of the object wave beams.

2. An optical recording and reproducing apparatus as set forth in claim 1, further comprising:

servo controlling means for focussing and tracking of the light beams during recording and reproducing operations in accordance with the reflected light from said optical recording medium.

3. The apparatus of claim 1, wherein:

said optical recording medium is a magneto-optical recording medium where recording of the pit pattern is carried out with respect to an area having temperature of not less than the Curie temperature during projection of the recording-use light beam, and a pit width of the pit pattern is less than half of a track width.

4. An optical reproducing apparatus for reproducing of a pit pattern from an optical recording medium where two rows of pit patterns are recorded on one track, comprising:

light beam generating means for generating a reproducing-use light beam;

light receiving means for receiving incident light thereon so as to output a signal varying depending on the incident light;

light beam guiding means for guiding the reproducing-use light beam to said optical recording medium so as to form a light spot, and for guiding reflected light of the light spot to said light receiving means;

judging means for judging the pit pattern in accordance with said light receiving means;

means for reproducing of information in accordance with the judgement by said judging means that which kind of pit pattern is reproduced;

wherein said optical recording medium is a magneto-optical recording medium, said light beam guiding means including:

a first beam splitter for receiving the light beam;

a half mirror which is provided between said magneto-optical recording medium and said first beam splitter so as to be disposed next to said first beam splitter;

an objective lens which is provided between said half mirror and said magneto-optical recording medium;

second beam splitter, which receives the reflected light from the spot through said objective lens and said half mirror, for splitting the reflected light into a P polarizing component and an S polarizing component;

first hologram device, on which each reflected object wave of the pit patterns is recorded, for diffracting the reflected object wave in accordance with the split P polarizing component;

first light detecting means for receiving diffracted light from said first hologram device, and for outputting an electric signal varying depending on the incident light amount thereon;

second hologram device, on which each reflected object wave of the pit patterns is recorded, for diffracting the reflected object wave in accordance with the split S polarizing component;

second light detecting means for receiving diffracted light from said second hologram device, and for outputting an electric signal varying depending on the incident light amount thereon;

said first and second hologram devices are formed by interference fringes between (1) the object wave beams of the respective P polarizing component and an S polarizing component and (2) the respective reference wave beams of the corresponding polarizing components which light amounts substantially equal those of the object wave beams.

5. The optical recording and reproducing apparatus as set forth in claim 4, wherein:

the pit pattern includes four kinds, said first and second light detecting means are four-divided photodetectors respectively, and said judging means specifies the reproduced pit pattern in accordance with sums of outputs of the corresponding photodetectors.

* * * * *